United States Patent
Kong

(10) Patent No.: US 7,464,958 B2
(45) Date of Patent: Dec. 16, 2008

(54) PASSENGER AIRBAG DOOR STRUCTURE

(75) Inventor: Byung Seok Kong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/595,731

(22) Filed: Nov. 8, 2006

(65) Prior Publication Data
US 2008/0048419 A1 Feb. 28, 2008

(30) Foreign Application Priority Data
Aug. 24, 2006 (KR) .................. 10-2006-0080655

(51) Int. Cl.
*B60R 21/20* (2006.01)
(52) U.S. Cl. ................................. 280/728.3
(58) Field of Classification Search .............. 280/728.3, 280/732
See application file for complete search history.

(56) References Cited

U.S. PATENT DOCUMENTS

| 6,568,705 | B2 | 5/2003 | Kinane | |
| 7,007,970 | B2* | 3/2006 | Yasuda et al. | 280/728.3 |
| 2004/0075251 | A1* | 4/2004 | Fujii et al. | 280/728.3 |
| 2004/0119267 | A1* | 6/2004 | Cowelchuck et al. | 280/728.3 |
| 2004/0164524 | A1* | 8/2004 | Ono et al. | 280/728.3 |
| 2005/0104346 | A1* | 5/2005 | Suwama et al. | 280/732 |
| 2006/0131844 | A1* | 6/2006 | Trevino et al. | 280/728.3 |
| 2006/0202448 | A1* | 9/2006 | Sawada et al. | 280/728.3 |
| 2006/0249931 | A1* | 11/2006 | Nishijima et al. | 280/728.3 |
| 2006/0267314 | A1* | 11/2006 | Yasuda et al. | 280/728.3 |
| 2007/0018434 | A1* | 1/2007 | Hayashi | 280/728.3 |
| 2007/0052211 | A1* | 3/2007 | Hayashi | 280/728.3 |

FOREIGN PATENT DOCUMENTS

| JP | 2002-220019 | 8/2002 |
| JP | 2004-175248 | 6/2004 |
| JP | 2005-138674 | 6/2005 |
| JP | 2005-212695 | 8/2005 |
| KR | 10-2004-0046663 A | 6/2004 |

* cited by examiner

*Primary Examiner*—Faye M. Fleming
(74) *Attorney, Agent, or Firm*—Peter F. Corless; Edwards Angell Palmer & Dodge LLP

(57) ABSTRACT

Disclosed are a passenger airbag door structure in which a pad deploying part and an airbag door part are integrally formed and a method of making the same.

16 Claims, 6 Drawing Sheets

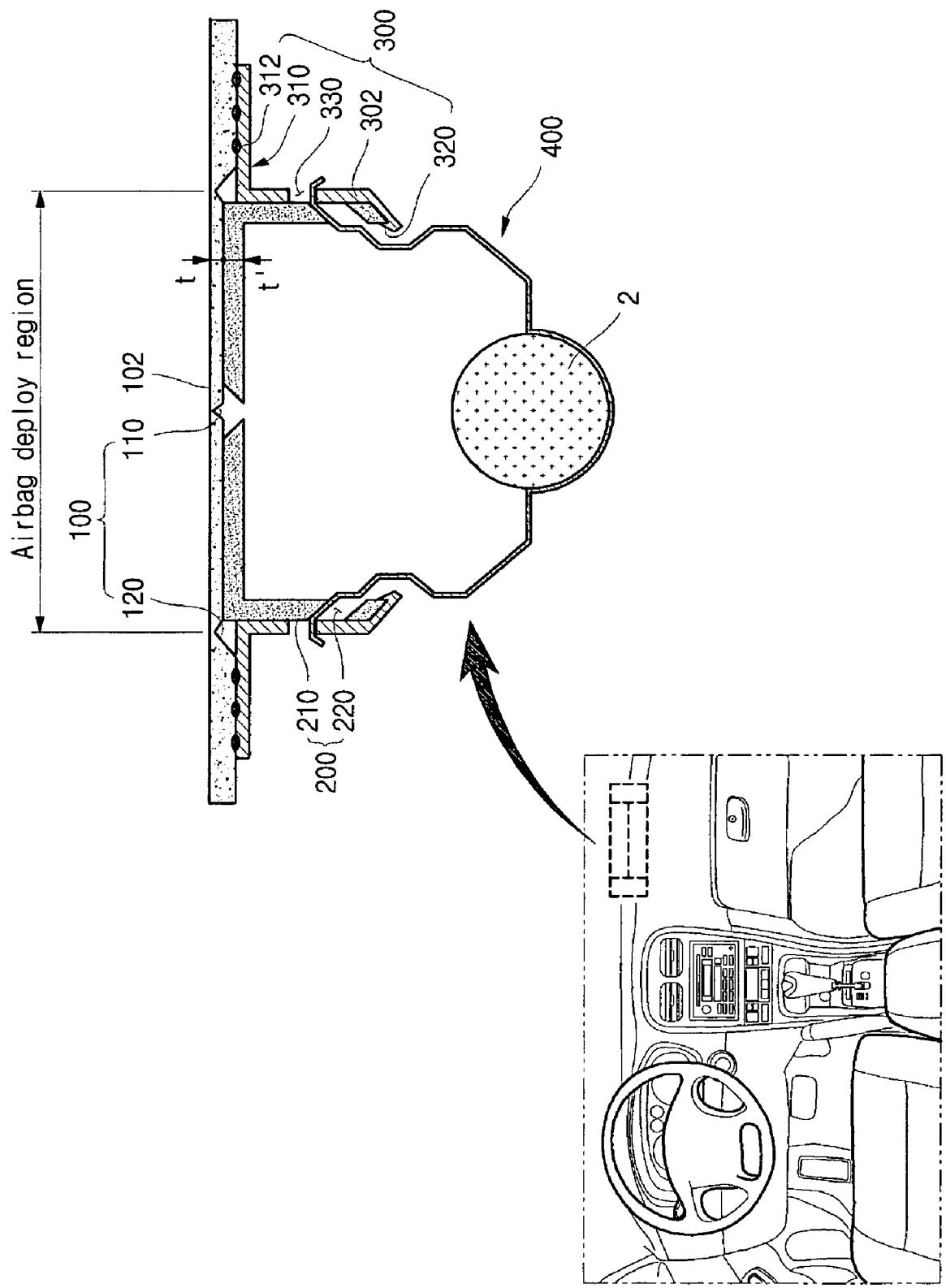
[FIG. 1]

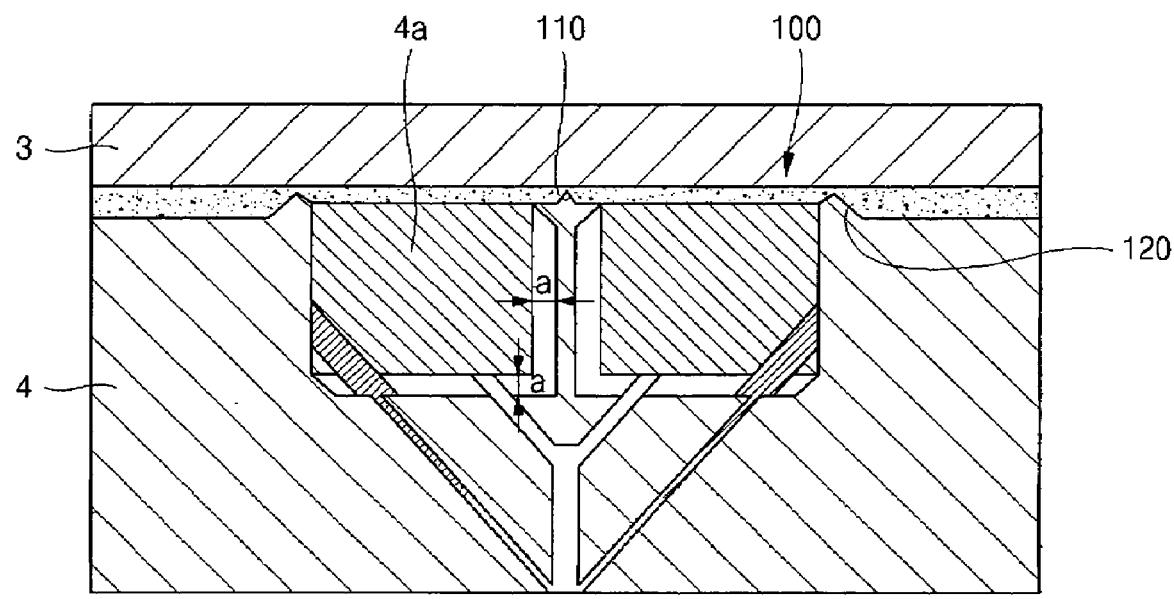
[FIG. 2a]
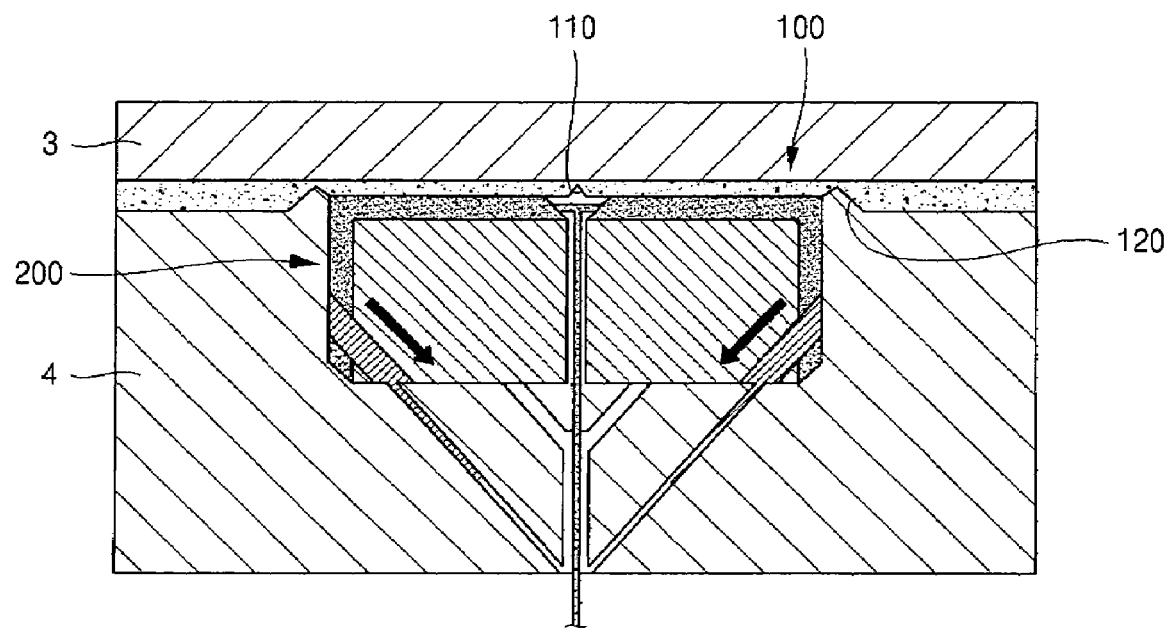
[FIG. 2b]

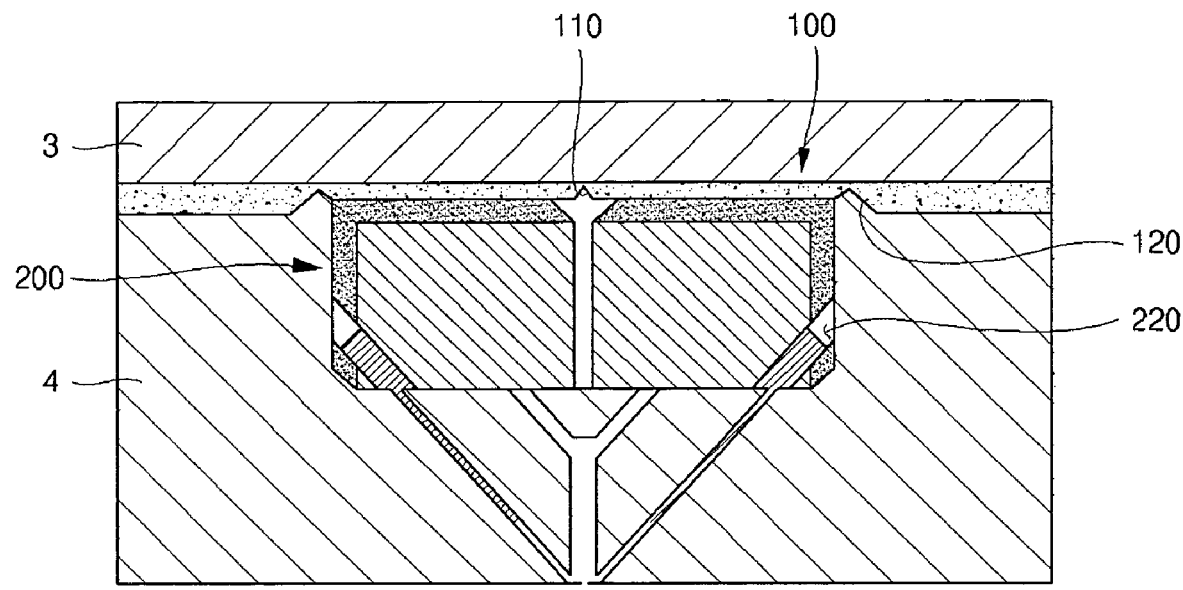
[FIG. 2c]
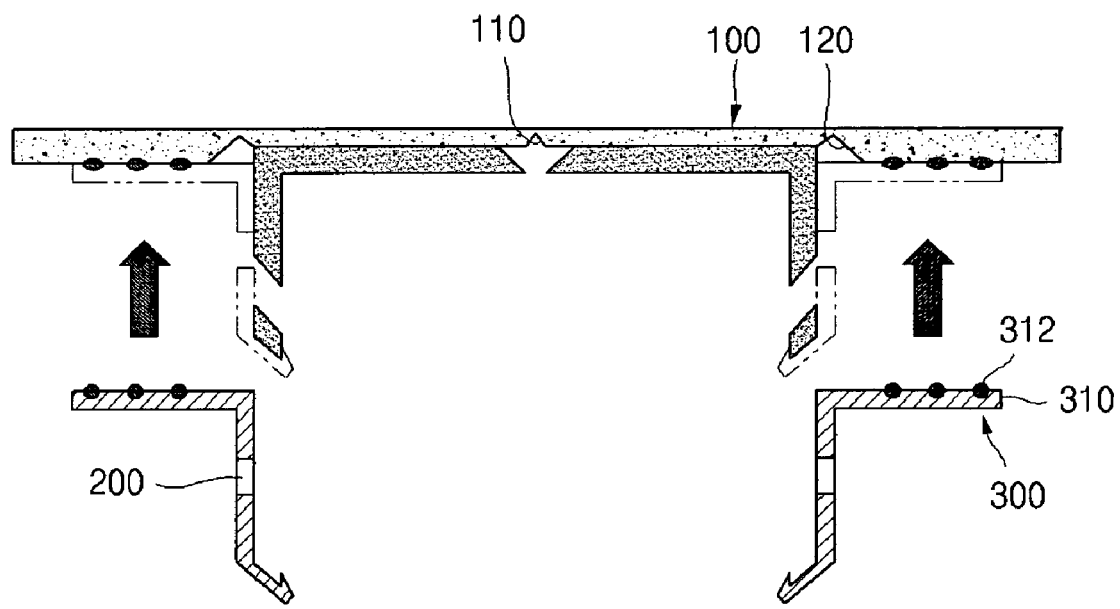
[FIG. 2d]

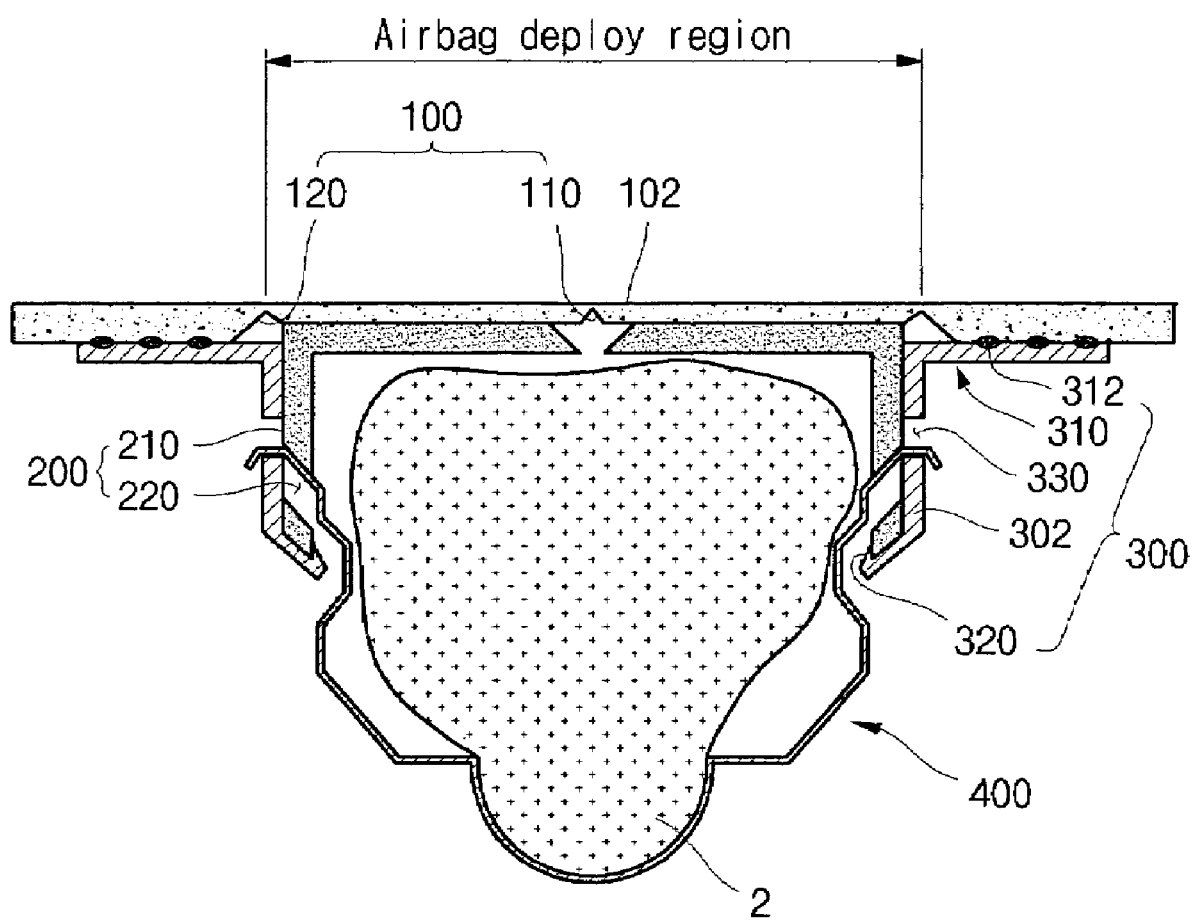
[FIG. 3a]

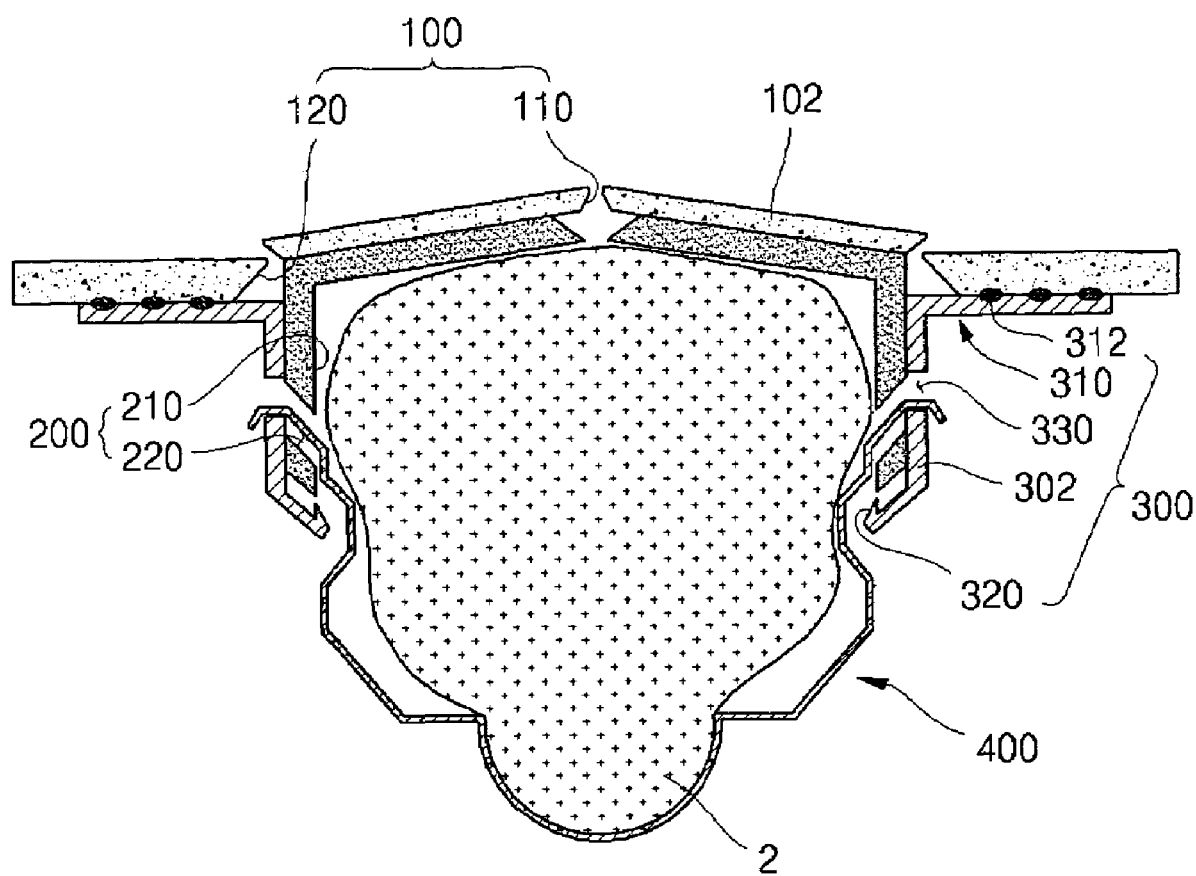
[FIG. 3b]

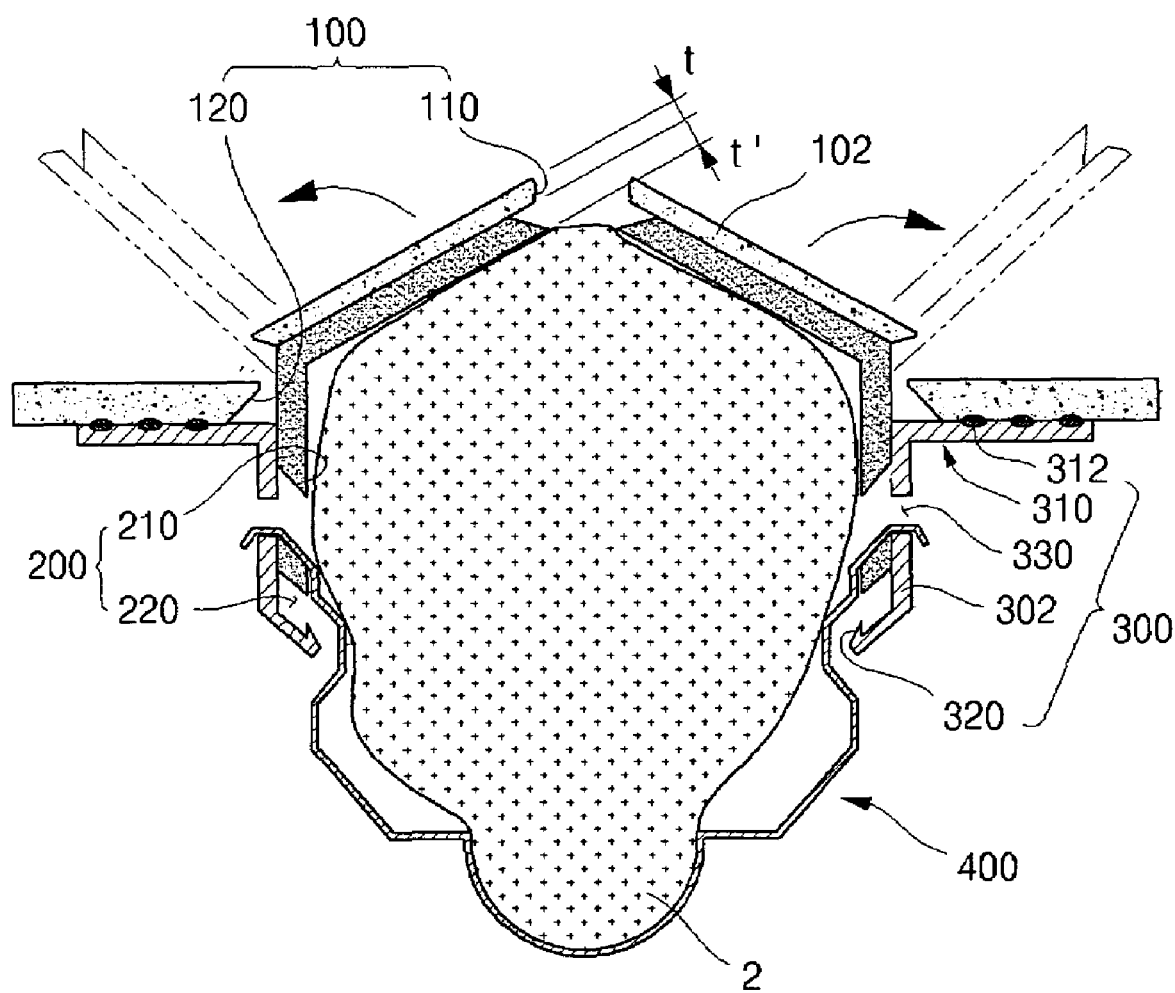
[FIG. 3c]

PASSENGER AIRBAG DOOR STRUCTURE

CROSS-REFERENCE TO RELATED APPLICATION

This application claims priority to and the benefit of Korean Patent Application No. 10-2006-0080655 filed in the Korean Intellectual Property Office on Aug. 24, 2006, the entire contents of which are incorporated herein by reference.

BACKGROUND OF THE INVENTION (a) Field of the Invention

The present invention relates to a passenger airbag door structure in which a pad deploying part and an airbag door part are integrally formed by an injection molding method and having advantages in that the airbag door part can stably rotate by deployment of the airbag and a malfunction due to an interference and a generation of fragments can be prevented.

(b) Description

Airbags have been widely adopted to protect passengers as well as drivers from a possible automotive vehicle accident.

Particularly, airbags have been installed within a steering wheel in order to protect a driver, and they have been installed within a crash pad in front of a passenger seat in order to protect a passenger.

Conventionally, a passenger airbag includes an airbag housing disposed within a crash pad for housing the airbag, a door plate installed in the crash pad to be positioned in front of the airbag housing and provided with a rotating part, a chute for coupling the airbag housing to the crash pad, and a door cover provided on a front surface of the crash pad. The chute is fixed to an end portion of the door plate by a bolt.

In the conventional airbag structure, when a vehicle collision occurs, the airbag expands to press the door plate, and a tear line pre-formed in the door cover is broken, thereby deploying the airbag.

The conventional airbag structure, however, has a drawback that the as the rotating part is short or thick, the door plate cannot sufficiently expand so that an end portion of the door cover may be folded and broken and the resulting fragments may be directed toward a passenger.

There is thus a need for a passenger airbag structure that can stably rotate the airbag door part during the deployment of an airbag so as to avoid interferences among elements positioned in a rotating region of the door cover.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the present invention provides a passenger airbag door structure in which a pad deploying part and an airbag door part are integrally formed by an injection molding method.

A preferred passenger airbag door structure may comprise: (a) a pad deploying part having a pad body which includes on its lower surface (i) an incision groove through which the airbag is configured to be deployed toward a passenger, and (ii) a plurality of breaking parts spaced from the incision groove and configured to be broken by a deploying pressure of the airbag; and (b) an airbag door part including at its both ends extension parts each of which is extending from and downwardly bent at a position near the breaking part and defines therein a first coupling hole configured to enable the extension part to slide forward together with the pad deploying part during deployment of the airbag.

Preferably, passenger airbag door structures of the present invention may further comprise a chute part including chute bodies, each of which (i) having upper end portion, lower end portion, and bent end portion between the upper and lower end portions, wherein the upper end portion is fixed to a lower surface of the pad deploying part, and the lower end portion defines a hook formed by inwardly bending the lower end portion, and (ii) defining therein a second coupling hole formed at a position spaced from the first coupling hole of the airbag door part.

Also preferably, passenger airbag door structures of the present invention may further comprise an airbag module housing both end portions of which are connected to the chute body.

In a preferred embodiment, an incision groove may be formed on the lower surface of the pad body longitudinally.

Suitably, a section of the incision groove of the pad deploying part may be formed as a shape of □ or a shape of H.

Preferably, breaking parts may have a thickness such that they can be broken by a deploying pressure of the airbag.

Suitably, extension parts may be formed integrally with a lower portion of the pad deploying part by an injection molding.

Preferably, the hook may be surface-contacting an outer side of an end portion of the extension part of the airbag door part.

In a preferred embodiment, the end portions of the airbag module housing may suitably pass through the first coupling hole of the airbag door part and the second coupling hole of the chute part.

Preferably, the pad deploying part may be formed of harder material than the airbag door part is. Also preferably, the airbag door part may have a thickness greater than the pad deploying part has.

In still another preferred embodiment, the first bent end portion of the chute body may suitably be fixed to the pad deploying part by a vibration welding method.

In a further preferred embodiment, chute parts may be provided with a welding strip on the first bent end portion which is welded by friction heat during a vibration welding.

In another aspect, the present invention provides a method of producing a passenger airbag door structure, comprising the steps of: (a) injection molding a plastic material to form a pad deploying part; (b) stamping an incision groove and breaking parts into the pad deploying part; (c) injection molding a plastic material softer than the material used in step (a) to form an airbag door part; and (d) forming a first coupling hole in the airbag door part.

A preferred method of the present invention may further comprise the step of fixing a bent end portion of a chute part to a lower surface of the pad deploying part by vibration welding.

In still another aspect, motor vehicles are provided that comprise the passenger airbag door structure as described above.

In a further aspect, motor vehicles are provided that comprise a passenger airbag door structure prepared by the method as described above.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present airbag door structure will be particularly useful with a wide variety of motor vehicles, including automobiles, trucks, and the like.

Other aspects of the invention are discussed infra.

BRIEF DESCRIPTION OF THE DRAWINGS

FIG. 1 is a drawing showing a passenger airbag door structure according to an exemplary embodiment of the present invention.

FIG. 2A to FIG. 2D are drawings showing preparation processes of a passenger airbag door structure according to an exemplary embodiment of the present invention.

FIG. 3A to FIG. 3C are drawings showing modes of operation of a passenger airbag door structure according to an exemplary embodiment of the present invention.

Reference numerals set forth in the Drawings includes reference to the following elements as further discussed below:
100: pad deploying part
110: incision groove
120: breaking part
200: airbag door part
210: extension part
220: first coupling hole
300: chute part
400: airbag module housing

DETAILED DESCRIPTION

As discussed above, in one aspect, the present invention provides a passenger airbag door structure comprising: (a) a pad deploying part having a pad body which includes on its lower surface (i) an incision groove through which the airbag is configured to be deployed toward a passenger, and (ii) a plurality of breaking parts spaced from the incision groove and configured to be broken by a deploying pressure of the airbag; and (b) an airbag door part including at its both ends extension parts each of which is extending from and downwardly bent at a position near the breaking part and defines therein a first coupling hole configured to enable the extension part to slide forward together with the pad deploying part during deployment of the airbag.

In another aspect, the present invention provides a method of producing a passenger airbag door structure, comprising the steps of: (a) injection molding a plastic material to form a pad deploying part; (b) stamping an incision groove and breaking parts into the pad deploying part; (c) injection molding a plastic material softer than the material used in step (a) to form an airbag door part; and (d) forming a first coupling hole in the airbag door part.

In still another aspect, motor vehicles are provided that comprise the passenger airbag door structure as described above.

In a further aspect, motor vehicles are provided that comprise a passenger airbag door structure prepared by the method as described above.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

FIG. 1 is a drawing showing a passenger airbag door structure according to an exemplary embodiment of the present invention, FIG. 2A to FIG. 2D are drawings showing preparation processes of a passenger airbag door structure according to an exemplary embodiment of the present invention, and FIG. 3A to FIG. 3C are drawings showing modes of operation of a passenger airbag door structure according to an exemplary embodiment of the present invention.

Referring to FIG. 1 to FIG. 3C, a pad deploying part 100 includes an incision groove 10 and braking parts 120. An incision groove 110 is longitudinally formed on an inner lower surface of a pad body 102 which is provided in an airbag deploy region and is configured to be deployed toward a passenger. It is preferable that a section of the incision groove 110 is formed as a shape of □ or a shape of H, because this shape is suitable for deployment of an airbag 2.

Breaking parts 120 are spaced from the incision groove 110, preferably in both the left and the right sides of the incision groove. The breaking parts have a thickness such that they can be broken by a deploying pressure of a passenger airbag.

Airbag door part 200 has extension parts 210. Both ends of the extension parts which are extending from and downwardly bent at a position near the breaking part 120. The extension part is formed integrally with a lower portion of the pad deploying part 100 by an injection molding. The extension part also defines thereon a first coupling hole 220 so that the extension part 210 may slide forward together with the pad deploying part 100 when the passenger airbag deploys.

The passenger airbag door structures according to an exemplary embodiment of the present invention may further include a chute part 300 and an airbag housing module 400. The chute part 300 includes a chute body 302 in size allowing it to house the airbag door part 200. It may also include first bent end portions 310 formed by bending both upper ends of the chute body 302 and coupled to a lower surface of the pad deploying part 100. It may also include a hook 320 formed by inwardly bending lower ends of the chute body 302 and surface-contacting an outer side of the end portion of the extension part 210 of the airbag door part 200. It may also define therein a second coupling hole 330 at a position upwardly spaced from the first coupling hole 220 of the airbag door part 200.

Airbag housing module 400 is connected to chute body 302. Particularly, for example, end portions of the airbag housing module 400 may pass through the first coupling hole 220 of the airbag door part 200 and the second coupling hole 330 of the chute part 300.

The pad deploying part 100 and the airbag door part 200 may be made of plastic materials. Preferably, the material to be used to prepare the airbag door part is softer than that of the pad deploying part. For example, the pad deploying part 100 may be made of hard PPF (Polypropylene Filled) material, and the airbag door part 200 may be made of TPO (Thermo Plastic Olefin) with a high softness. The reason why the airbag door part 200 is made of TPO material is that a change of physical properties of TPO material in response to a temperature change is so small that the performance of the airbag door part 200 can be constantly maintained even when a significant change in temperature occurs.

Preferably, the first bent end portion 310 of the chute part 300 is fixed to the pad deploying part 100 by a vibration welding method.

Also preferably, the chute part 300 may be provided with a welding strip 312 on the first bent end portion 310, and the welding strip 312 can be welded by friction heat during the vibration welding.

It is preferable that the thickness, t', of the airbag door part 200 is greater than the thickness, t, of the pad deploying part 100, so that the airbag door part 200 made of soft material may allow the pad deploying part 100 to easily spread into a passenger room without being separated or being broken into fragments when the pad deploying part 100 is directed toward a passenger by the deploying pressure of the airbag 2.

Preparation processes of the passenger airbag door structure according to an exemplary embodiment of the present invention will be explained hereinafter with reference to FIG. 2A to FIG. 2D.

Referring to FIG. 2A, in the state that an upper mold 3 and a lower mold 4 are joined together, material for the pad deploying part 100 is injected by a catapult (not shown).

While the pad deploying part 100 is formed, slide molds 4a are positioned to be spaced from the lower mold 4 by "a". In this state, material for the pad deploying part is inserted by the catapult to for the pad deploying part 100 with conformation to shapes of the incision groove 110 and the breaking part 120.

The lower mold 4 is provided with a protrusion in a shape of □ or in a shape of H so as to form the incision groove 110 of the pad deploying part 100.

Referring to FIG. 2B, after the injection for the pad deploying part 100 is completed, the slide molds 4a move in the directions of the arrows shown in the FIG, respectively. While slide molds 4a are moved in the direction of the arrows, an injection for the airbag door part 200 is performed by a catapult. An injection for the first coupling hole 220 of the airbag door part 200 is performed by a separate injection line.

Referring to FIG. 2C, after the injection for the airbag door part 200 is completed, the injection line is retreated to form the first coupling hole 220 in the airbag door part 200.

Referring to FIG. 2D, in state where both the upper and the lower molds 3 and 4 (referring to FIG. 2A) for an injection molding of the pad deploying part 100 and the airbag door part 200 are retreated, the first bent end portion 310 of the chute part 300 is fixed to the lower surface of the pad deploying part 100 by a vibration welding. The welding strip 312 provided on the first bent end portion 310 is welded by the friction heat generated during the vibration welding, thereby fixing the first bent end portion 310 to the lower surface of the pad deploying part 100.

Modes of operation of the passenger airbag door structures of the present invention will be explained hereinafter with reference to the accompanying drawings.

Referring to FIG. 3A, if a vehicle collision occurs, sensors (not shown) detect the collision, and the airbag 2 is deployed.

The airbag 2 expands to deploy toward the fore part of the airbag housing module 400 by an inflator (not shown), thereby pressing a lower portion of the airbag door part 200.

Referring to FIG. 3B, an expanding force of the airbag 2 acts on the lower portion of the airbag door part 200 as shown in FIG. 3A, so the whole of the airbag door part 200 moves forward. Accordingly, the breaking part 120 and the incision groove 110 that are formed at both lower sides of the pad deploying part 100 are broken, and the airbag door part 200 integrated to the pad deploying part 100 slides along a longitudinal direction of the first coupling hole 220 formed in the extension part 210 of the airbag door part 200.

Referring to FIG. 3C, while the airbag 2 deploys, the pad deploying part 100 integrated to the airbag door part 200 rotates in the direction of the arrows. If the pad deploying part 100 reaches the position shown in a broken line, the bent portion of the extension part 210 of the airbag door part 200 integrated to the pad deploying part 100 serves as a hinge, so that the pad deploying part 100 can smoothly expand.

As discussed above, the airbag door part 200 is made of material softer than material of the pad deploying part 100, and the thickness, t', of the airbag door part 200 is greater than the thickness, t, of the pad deploying part 100, thereby guiding the pad deploying part 100 so as to stably rotate as shown in the broken line.

Passengers can be protected from a vehicle collision by the stable operation of the pad deploying part 100, and the pad deploying part 100 can be prevented from being broken into fragments, resulting in no injuries to passengers.

According to preferred passenger airbag door structures of the present invention, since the pad deploying part and the airbag door part are integrally formed by the injection molding method, manufacturing cost can be reduced by a unification of the mold, and a gap and a step can be eliminated.

In addition, since members such as a metal plate and a ring that are used in the conventional methods are not necessary, manufacturing cost and total product weight can be reduced. Furthermore, the airbag door part integrated to the pad deploying part can smoothly operate so that the pad deploying part can be prevented from being broken or being separated by the rotation thereof.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A passenger airbag door structure, comprising:
   (a) a pad deploying part having a pad body which includes on its lower surface (i) an incision groove through which the airbag is configured to be deployed toward a passenger, and (ii) a plurality of breaking parts spaced from the incision groove and configured to be broken by a deploying pressure of the airbag;
   (b) an airbag door part including at its both ends extension parts each of which is extending from and downwardly bent at a position near the breaking part and defines therein a first coupling hole configured to enable the extension part to slide forward together with the pad deploying part during deployment of the airbag, wherein the airbag door part has a thickness greater than the pad deploying part; and
   (c) a chute part which includes chute bodies, each of chute bodies (i) having upper end portion, lower end portion, and bent end portion between the upper and lower end portions, wherein the upper end portion is fixed to a lower surface of the pad deploying part, and the lower end portion defines a hook formed by inwardly bending the lower end portion, and (ii) defining therein a second coupling hole formed at a position spaced from the first coupling hole of the airbag door part.

2. The passenger airbag door structure of claim 1, further comprising an airbag module housing both end portions of which are connected to the chute body.

3. The passenger airbag door structure of claim 1, wherein the incision groove is formed on the lower surface of the pad body longitudinally.

4. The passenger airbag door structure of claim 1, wherein the breaking part has a thickness such that it can be broken by a deploying pressure of the airbag.

5. The passenger airbag door structure of claim 1, wherein the extension part is formed integrally with a lower portion of the pad deploying part by an injection molding.

6. The passenger airbag door structure of claim 1, wherein the hook is surface-contacting an outer side of an end portion of the extension part of the airbag door part.

7. The passenger airbag door structure of claim 2, wherein the end portions of the airbag module housing pass through the first coupling hole of the airbag door part and the second coupling hole of the chute part.

8. The passenger airbag door structure of claim 1, wherein a section of the incision groove of the pad deploying part is formed as a shape of a carrot or a shape of H.

9. The passenger airbag door structure of claim 1, wherein the pad deploying part is formed of harder material than the airbag door part is.

10. The passenger airbag door structure of claim 1, wherein the airbag door part has a thickness greater than the pad deploying part has.

11. The passenger airbag door structure of claim 1, wherein the bent end portion of the chute body is fixed to the pad deploying part by a vibration welding method.

12. The passenger airbag door structure of claim 11, wherein the chute part is provided with a welding strip on the bent end portion which is welded by friction heat during a vibration welding.

13. A method of producing a passenger airbag door structure, comprising the steps of:
   (a) injection molding a plastic material to form a pad deploying part;
   (b) stamping an incision groove and breaking parts into the pad deploying part;
   (c) injection molding a plastic material softer than the material used in step (a) to form an airbag door part; and
   (d) forming a first coupling hole in the airbag door part.

14. The method of claim 13, further comprising the step of fixing a bent end portion of a chute part to a lower surface of the pad deploying part by vibration welding.

15. A motor vehicle comprising the passenger airbag door structure of claim 1.

16. A motor vehicle comprising a passenger airbag door structure made by the method of claim 13.

* * * * *